United States Patent [19]

Bergmann

[11] Patent Number: 5,771,120

[45] Date of Patent: Jun. 23, 1998

[54] OPTICAL APPARATUS WITH COMBINED POLARIZATION FUNCTIONS

[75] Inventor: Ernest Eisenhardt Bergmann, Borough of Fountain Hill, Pa.

[73] Assignee: Lucent Technologies Inc., Murray Hill, N.J.

[21] Appl. No.: 578,844

[22] Filed: Dec. 26, 1995

[51] Int. Cl.[6] .................................................... G02B 5/30
[52] U.S. Cl. ........................ 359/484; 359/494; 359/495; 359/501; 385/140
[58] Field of Search ....................... 385/11, 140; 359/494, 359/498, 502, 445, 483, 484, 485, 501

[56] References Cited

U.S. PATENT DOCUMENTS

| | | | |
|---|---|---|---|
| 4,236,783 | 12/1980 | Hepner et al. ............................. | 385/11 |
| 4,461,543 | 7/1984 | McMahon ................................ | 349/196 |
| 4,741,588 | 5/1988 | Nicia et al. ............................... | 385/11 |
| 4,744,075 | 5/1988 | Buhrer .................................... | 359/495 |
| 4,745,591 | 5/1988 | Foley ...................................... | 359/495 |
| 4,852,962 | 8/1989 | Nicia ....................................... | 385/11 |
| 4,987,567 | 1/1991 | Buhrer .................................... | 359/498 |
| 5,033,830 | 7/1991 | Jameson ................................. | 359/494 |
| 5,151,955 | 9/1992 | Ohta et al. .............................. | 385/11 |
| 5,381,250 | 1/1995 | Meadows ................................ | 385/16 |

Primary Examiner—Paul M. Dzierzynski
Assistant Examiner—John Juba, Jr.

[57] ABSTRACT

Apparatus performs polarization dependent functions although the apparatus is polarization independent with respect to the outside world. The apparatus produces parallel beams with like polarization, and the parallel beams are then subject to polarization dependent processing.

5 Claims, 2 Drawing Sheets

OPTICAL APPARATUS WITH COMBINED POLARIZATION FUNCTIONS

TECHNICAL FIELD

This invention relates generally to the field of optical apparatus and particularly to optical apparatus that performs optical functions that are independent of the polarization of an incoming optical beam.

BACKGROUND OF THE INVENTION

Optical communications systems, as well as other optical technologies, require apparatus that manipulates optical signals that are in the form of light rays. The best known apparatus for such manipulation is probably the ubiquitously used silica based optical fiber which is used for both short and long distance optical transmission. Additionally, other well known apparatus includes the filters, multiplexers, modulators, and power splitters and combiners that have been developed. The filters and multiplexers are useful in, for example, the wavelength division multiplexing systems that have been developed to increase the capacity of communications systems by transmitting information at a plurality of wavelengths.

The performance of some of these functions is complicated because the apparatus is polarization dependent; that is, the light must have a specific polarization for the desired function to be performed. Accordingly, care must be taken to insure that the input light beam has the proper polarization. Of course, this requirement greatly complicates both device and system design.

Accordingly, a device that performs polarization dependent functions but is polarization independent with respect to the world outside the device would be desirable.

SUMMARY OF THE INVENTION

According to an exemplary embodiment of the invention, optical apparatus has a first port adapted to receive unpolarized incoming light, and attached to the first port, apparatus for producing parallel beams with like polarization. In a preferred embodiment, the beams are linearly polarized, and the like polarization is parallel polarization. The parallel beams are then processed by polarization dependent apparatus to perform functions such as power splitting and combining, filtering, wavelength division multiplexing, and modulating. Other functions may also be performed, and the apparatus may perform combination of the functions. The apparatus may further include apparatus to recombine the beams after processing so that the beams exit from the apparatus at a second port which functions as an output as an unpolarized beam.

DETAILED DESCRIPTION

Figure 1:
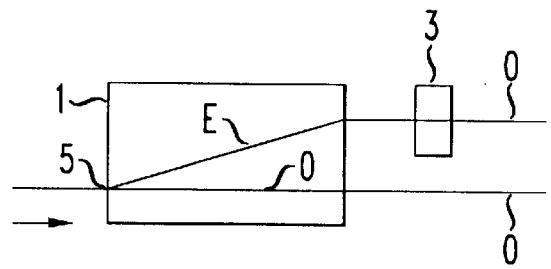
FIGS. 1 and 2 are sectional views of devices useful in producing parallel beams with like polarizations for further processing.

Exemplary apparatus useful for producing parallel beams with like polarization will be described before embodiments of the invention are described. Shown in FIG. 1 are walk-off device 1 and polarization flipper 3. The direction of propagation of the incoming beam is designated by the arrow; the walk-off device splits the incoming beam into ordinary and extraordinary beams which are designated as O and E, respectively. The incoming beam enters the device at port 5 which is adapted to receive the incoming light and functions as an input. The E beam passes through the polarization flipper 3. The E component is changed into O, and there are two parallel O beams. The two O beams exiting from the device are parallel and have like polarizations after polarization flipping. The walk-off device may be fabricated from a birefringent material such as calcite or rutile; such materials are well known and the walk-off device will be readily fabricated by those skilled in the art as will the polarization flipper.

Although the beam is shown as going from left to right with the device operating as a polarization splitter, the device may also be operated as a polarization combiner with the two O beams going from right to left and entering the device on the right side. The polarization flipper is now used so that the O component is changed into E when combining. When combining, the walk-off device 1 then walks the E and O beams (one O beam has been changed to E polarization by polarization flipper 3) together so that both beams combine and exit at port 5 which now functions as an output. The device depicted may be termed an OPSOC device which is an acronym for "O Polarization Splitter Or Combiner."

Figure 2:
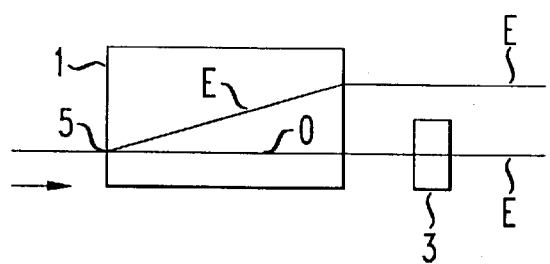

The polarization flipper 3 may flip the polarization of the O ray exiting from the first walk-off device 1; such a device in depicted in FIG. 2. The device is similar to that depicted in FIG. 1 except that the two outgoing beams are E beams because the O beam passes through the first polarization flipper 3. Accordingly, the device is conveniently referred to as an EPSOC which is an acronym representing "E Polarization Splitter Or Combiner." The EPSOC device is generally similar to the OPSOC device; however, the polarization flipper is used to change the O polarization component into E when splitting and to change the E polarization component into O when combining.

Figure 3:
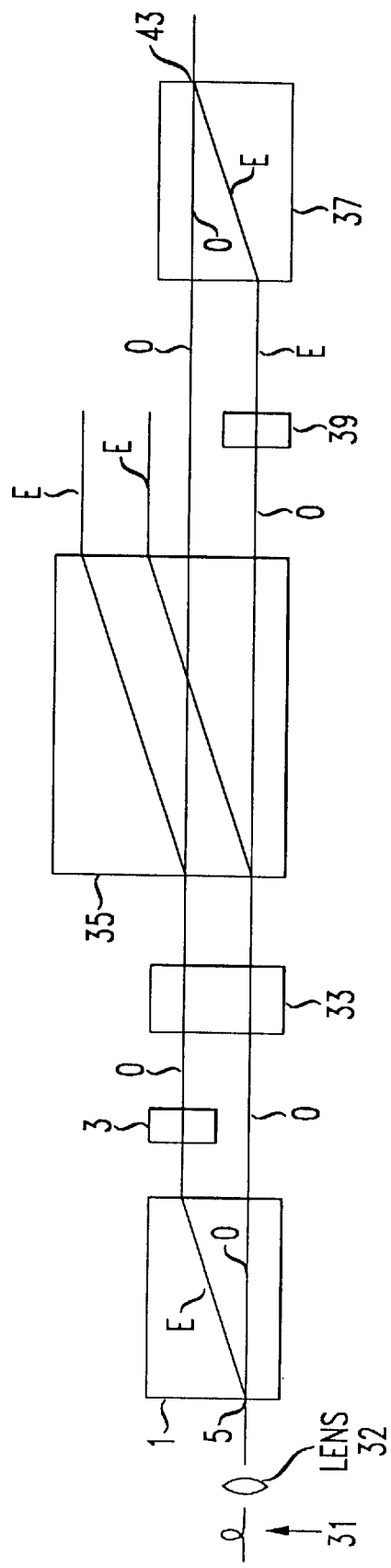
FIG. 3 is power splitter according to this invention.

FIG. 3 shows a power splitter which is an exemplary embodiment of this invention. The incoming beam from optical fiber 31 is received at port 5 after passing through lens 32. Lens 32 is present to produce a collimated beam on the port 5. The parallel beams, produced by OPSOC device such as described with respect to FIG. 1 and having walk-off device 1 and polarization flipper 3, are incident upon polarization modifier 33 which, for example, rotates the polarization of both beams a selected and variable amount. After the polarization modifier, the beams are incident upon and pass thorough a walk-off device 35. In a preferred embodiment, the device 35 is formed from a birefringent material. The effect produced by polarization modifier 33 determines how the incident energy is split into the O and E beams in the walk-off device 35. Polarization modifier 33 may include a Faraday rotator. It also depends upon a possible twist of walk-off device 35 with respect to the plane of the drawing. The two O or the two E beams may be recombined after the birefringent material. For example, the O beams from walk-off device 35 are incident upon a second OPSOC device having walk-off device 37 and polarization flipper 39 which changes an O beam to an E beam. The two beams are walked together so that they exit simultaneously at the output 43. The beams are coupled into optical fiber through a lens (not shown) in well known manner. The E beams on the right side of walk-off device 35 may be coupled into yet another EPSOC device, go to a photodetector or be discarded. The variable polarization modifier permits a continuously variable percentage of the incoming unpolarized beam to be coupled into either the O or E beams in the birefringent material and hence, the percentage of unpolarized light emerging from the output 43. It will be appreciated that if the percentage can be changed between 0 and 100 percent, the apparatus functions as a switch.

Figure 4:
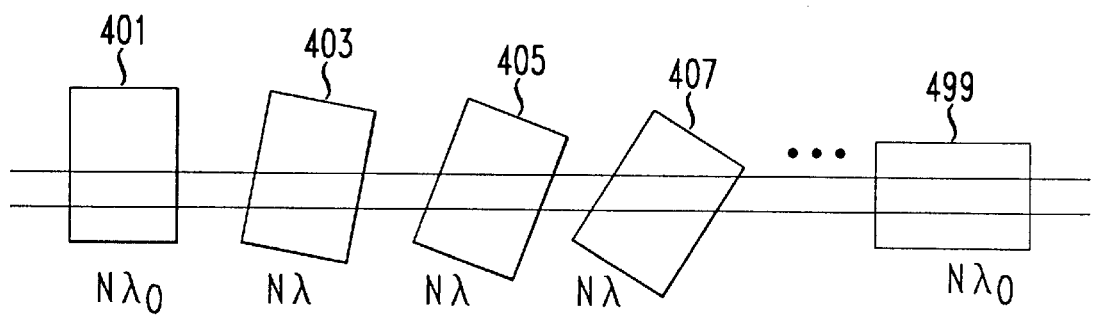
FIG. 4 is a filter according to this invention.

FIG. 4 depicts a filter in accordance with this invention. For reasons of clarity, the apparatus that produces the pair of parallel beams at the input, and the apparatus that combines the parallel beams at the output are not shown. Apparatus such as that depicted with respect to FIG. 3 may be used; of course, other types of apparatus may also be used. Depicted is a plurality of N-wave plates 401, 403, 405, 407, ..., and 499 that have their fast (or slow) axes tilted at progressively increasing angles with respect to the vertical; that is, they have a varying orientation with respect to the parallel beams. For reasons of clarity, the individual layers of the N-wave plates are not depicted and not all plates are shown. N is an integer; a typical value is 100 although any large value will suffice depending on the application. The N-wave plates are made of a birefringent material which does not appear birefringent at the design wavelength; that is, the wavelength that the filter will transmit without changing the state of polarization. The number of N wave plates used will depend upon the desired filtering action; 8 will likely produce good results for many applications. Even 1 will suffice for some applications. Wavelengths other than the desired transmission wavelength see birefringence in the plates and are modified as they pass through the series of plates. For the case of gradually increasing tilt, the polarization will be dragged in direction. If the last plate is approximately perpendicular to the first plate, then the exit polarization will be approximately perpendicular to the starting polarization (except for the design wavelength where the wave plates do not appear to be polarizationally effective).

Variations in the embodiments will be readily thought of by those skilled in the art. For example, devices other than those depicted in FIGS. 1 and 2 may be used to produce parallel beams with like polarization. Additionally, the beams need not have parallel polarization for all applications; like polarization will suffice. For example, the beams may have elliptical polarization of which circular polarization is a special case. Moreover, a modulator is easily made by using a Pockel's cell as element 33 in FIG. 3. Some of the output beams may be incident on a photodetector which collects the incident beams. Of course, more than one polarization dependent function may be performed. For example, the beams may be both modulated and split.

The invention claimed is:

1. Optical apparatus comprising:

at least a first walk-off device, said walk-off device for separating an incoming unpolarized beam into first and second parallel beams of orthogonal polarization;

at least a first polarization flipper positioned to change the polarization of one of the first and second beams from the first walk-off device so that the polarizations of both first and second beams are essentially the same;

a polarization modifier for rotating the polarization of both beams a selected and variable amount;

at least a second walk-off device for separating each of said first and second beams into two parallel beams of orthogonal polarization, thereby producing a first pair of parallel beams of orthogonal polarization associated with said first beam, and a second pair of parallel beams of orthogonal polarization associated with said second beam; and at least a first output means for receiving one beam from each of said first and second pair of parallel beams, the received beams being of like polarization, for combining said received beams into a single output beam, the percentage of said unpolarized incoming beam forming said output beam depending upon the rotation present in said polarization modifier.

2. Optical apparatus as defined in claim 1 wherein the at least a first output means comprises a second polarization flipper positioned to change the polarization of one of the received beams so that the polarizations of the received beams are orthogonal; and a third walk-off device for combining the parallel received beams of orthogonal polarization into the single output beam.

3. Optical apparatus as recited in claim 1 in which said polarization modifier comprises at least one multiwave plate formed of a birefringent material.

4. Optical apparatus as recited in claim 3 in which said polarization modifier comprises at least two multiwave plates having varying orientation with respect to the first and second beams.

5. Optical apparatus as recited in claim 3 in which the polarization modifier comprises a plurality of N multiwave plates disposed such that each multiwave plate exhibits a progressively increasing angle of orientation with respect to the first and second beams.

* * * * *